UNITED STATES PATENT OFFICE.

FRANCIS L. STEWART, OF MURRYSVILLE, PENNSYLVANIA, ASSIGNOR OF ONE-HALF TO SAMUEL E. GILL, OF PITTSBURG, PENNSYLVANIA.

PROCESS OF MAKING LEVULOSE, GLUCOSE, &c.

No. 879,422.     Specification of Letters Patent.     Patented Feb. 18, 1908.

Application filed November 12, 1906. Serial No. 342,963.

*To all whom it may concern:*

Be it known that I, FRANCIS L. STEWART, of Murrysville, Westmoreland county, Pennsylvania, have invented a new and useful Process of Making Levulose, Glucose, &c., from the Jerusalem Artichoke, of which the following is a full, clear, and exact description.

My invention relates to utilizing the Jerusalem artichoke (*Helianthus tuberosus*) for the manufacture of saccharine products, which may either be concentrated into syrup or converted into alcohol.

In carrying out my invention, I take the artichoke tubers at maturity, that is, when the stocks are dead, and reduce them to a pulp by any suitable step, such as rasping or grinding. The tubers may be used either in the fresh condition as taken from the ground, or they may be dried either as tubers or after being sliced or ground to pulp. The fine pulp is then mixed with water, which if the tubers are in the wet condition is preferably about equal in volume to that of the tubers. If the tubers have been dried, the water is preferably about double their volume. The mixture is preferably made in a heating tank or digester, and a solution of oxalic acid is then added in a sufficient amount to cause the solution to redden blue test paper. After the oxalic acid is added the mixture is then heated, to a temperature of about 212 degrees Fahrenheit, preferably for about three hours if the heating tank is open; or about half that time if a closed tank or digester is employed, in which it is subjected to about 80 to 100 pounds steam pressure. A lime or aluminium salt is then added, preferably in the form of hydrate of alumina, or hydrate of carbonate of lime. The salt is preferably added gradually to the mixture, which is stirred during this time, to an amount sufficient to make the solution neutral to test paper. The liquid is then strained off from the pulpy matter and the wet pulp then subjected to a hydrostatic pressure to recover the remainder of the liquid. By these steps, the substance known as inulin, which forms the main constituent in the juice of the tubers, together with a small proportion of another carbohydrate known as synanthrose, are converted directly into levulose and dextrose. The levulose ranks next to cane sugar in value as a commercial product, thus rendering valuable for practical use tubers which at the present time are utilized only for stock feeding.

If the solution is to be converted into a saccharine syrup, I then preferably treat it in a wooden tank with tannic acid until the solution shows an acid reaction. I then add a sufficient amount of silicate of soda or other soluble silicate, to perfect the clarification. Lime, preferably in the form of milk of lime, or a soluble salt of alumina, such as hydrate of alumina, is then added until the liquid is again neutral. It is then reheated to about 212 degrees F., and filtered, preferably through bone black.

The clarified saccharine solution thus obtained, which consists chiefly of levulose with a small proportion of glucose, is then reduced by evaporation, preferably in a vacuum apparatus, to a form of thick or dense syrup.

The advantages of my invention result from the utilizing for commercial purposes of a tuber which has heretofore been used only for stock-feeding purposes. These tubers contain a large amount of inulin, which is utilized by my method to give a valuable product. The use of oxalic acid I have found to be of especial advantage, as it may be entirely removed, whereas other acids, such as hydrochloric acid or sulfuric acid, would give deleterious constituents in the syrup. The process may be rapidly and cheaply carried out.

Different types of apparatus may be employed for carrying out my invention.

I claim:—

1. In the method of obtaining saccharine products from Jerusalem artichokes, the steps which comprise reducing the tubers to pulp, adding water and oxalic acid thereto, heating the mass, adding an alkaline salt and then separating the saccharine solution from the pulp and insoluble precipitate.

2. In the method of obtaining saccharine products from Jerusalem artichokes, the steps which comprise reducing the tubers to a pulp, adding water and oxalic acid, heating the mass, adding an alkaline salt, separating the saccharine solution from the pulp and insoluble precipitate, reacidifying the solution, clarifying the same, and again neutralizing the clarified solution.

3. In the method of obtaining saccharine products from Jerusalem artichokes, the steps which comprise reducing the tubers to a pulp, adding water and oxalic acid, heating the mass, adding an alkaline salt, separating the saccharine solution from the pulp and insoluble precipitate, adding tannic acid to the solution, clarifying it with a soluble silicate, and again neutralizing the solution.

4. In the method of obtaining saccharine products from Jerusalem artichokes, the steps which comprise reducing the tubers to a pulp, adding water and oxalic acid, heating the mass, adding an alkaline salt, separating the saccharine solution from the pulp and insoluble precipitate, adding tannic acid to the solution, clarifying it with a soluble silicate, again neutralizing the solution, and then reheating and filtering it.

5. The method of obtaining saccharine products from Jerusalem artichokes, which consists in reducing the tubers to a pulp, adding water and oxalic acid, heating the mass, neutralizing with an alkaline salt, separating the saccharine solution from the pulp and insoluble precipitate, reacidifying the solution with tannic acid, clarifying it with a soluble silicate, again neutralizing it with an alkaline salt, reheating it, filtering it through bone black, and finally concentrating the filtered saccharine solution.

In testimony whereof, I have hereunto set my hand.

F. L. STEWART.

Witnesses:
JOHN MILLER,
H. M. CORWIN.